US012802084B2

(12) United States Patent
Aidan

(10) Patent No.: US 12,802,084 B2
(45) Date of Patent: Nov. 17, 2026

(54) COSMETIC AUTHENTICITY VERIFICATION SYSTEM

(71) Applicant: ELC MANAGEMENT LLC, Melville, NY (US)

(72) Inventor: Christopher Aidan, Austin, TX (US)

(73) Assignee: ELC MANAGEMENT LLC, Melville, NY (US)

( * ) Notice: Subject to any disclaimer, the term of this patent is extended or adjusted under 35 U.S.C. 154(b) by 156 days.

(21) Appl. No.: 18/520,129

(22) Filed: Nov. 27, 2023

(65) Prior Publication Data

US 2025/0173734 A1 May 29, 2025

(51) Int. Cl.
*G06Q 30/018* (2023.01)

(52) U.S. Cl.
CPC .................................. *G06Q 30/018* (2013.01)

(58) Field of Classification Search
CPC ... G06Q 30/018–0185; G06Q 10/0832; G06Q 10/0841
See application file for complete search history.

(56) References Cited

U.S. PATENT DOCUMENTS

2005/0267790 A1* 12/2005 Skalsky ............... G06Q 20/108 705/70
2018/0365543 A1* 12/2018 Cha ...................... G06K 19/025
2019/0272495 A1* 9/2019 Moeller ............... G06Q 10/083
2020/0005332 A1* 1/2020 Gadol .................... G06Q 10/08
2022/0215382 A1* 7/2022 Chen ...................... G06Q 20/02
2023/0115684 A1* 4/2023 Juntilla ................ G06Q 30/018 705/41
2023/0118213 A1* 4/2023 Quigley ................. G06Q 20/40 705/65
2023/0153832 A1* 5/2023 Lipton ................. G06Q 30/018 705/318
2024/0127328 A1* 4/2024 Bunnell ............... G06Q 30/018
2024/0135306 A1* 4/2024 Rizzi .................. G06Q 10/0832

FOREIGN PATENT DOCUMENTS

CA 3089282 A1 * 8/2019 ......... G06Q 10/0833

OTHER PUBLICATIONS

Kaur, The Case for Blockchain in the Beauty Industry, Golden Gate University School of Law, 2020 (Year: 2020).*

(Continued)

*Primary Examiner* — Daniel Vetter
(74) *Attorney, Agent, or Firm* — MARSHALL, GERSTEIN & BORUN LLP

(57) ABSTRACT

Techniques for verifying authenticity of a cosmetic product using a distributed ledger include generating a transaction including identification information for a cosmetic product indicating a manufacturer of the cosmetic product. The transaction is augmented with a cryptographic signature from the manufacturer to prove the identity of the manufacturer. Additionally, the transaction is transmitted to at least one other participant in a distributed ledger network of participants maintaining the distributed ledger. A unique identifier is embedded on the cosmetic product or on packaging for the cosmetic product that references the identification information for a cosmetic product in the distributed ledger.

7 Claims, 8 Drawing Sheets

(56) References Cited

OTHER PUBLICATIONS

Thongruang, NFT-based authentic product verification and trading platform, Chulalongkorn University, 2022 (Year: 2022).*
Ma, et al., The Design of Brand Cosmetics Anti-counterfeiting System Based on RFID Technology, 2015 International Conference on Network and Information Systems for Computers, Wuhan, China, 2015, pp. 184-189, doi: 10.1109/ICNISC.2015.36 (Year: 2015).*
Wazid, et al., Secure authentication scheme for medicine anti-counterfeiting system in IoT environment, IEEE Internet of Things Journal 4.5 (2017): 1634-1646 (Year: 2017).*
Agarwal, et al., Blockchain technology for secure supply chain management: A comprehensive review, IEEE Access, vol. 10, 2022:85493-85517 (Year: 2022).*
Tsang, et al., Blockchain-driven IoT for food traceability with an integrated consensus mechanism, IEEE Access, vol. 7, 2019, pp. 129000-129017 (Year: 2019).*
Liu, et al., Industrial blockchain based framework for product lifecycle management in industry 4.0, Robotics and computer-integrated manufacturing, vol. 63, 2020, 101897 (Year: 2020).*
Kamath, Food traceability on blockchain: Walmart's pork and mango pilots with IBM, The Journal of the British Blockchain Association, vol. 1, No. 1, 2018 (Year: 2018).*
Violino, et al., Internet of beer: A review on smart technologies from mash to pint, Foods, vol. 9, No. 7, 2020, 950 (Year: 2020).*

* cited by examiner

COSMETIC AUTHENTICITY VERIFICATION SYSTEM

TECHNICAL FIELD

The present disclosure relates generally to systems and methods for verifying authenticity of cosmetic products, and more particularly to distributed ledgers to record cosmetic product information, where unique identifiers embedded on cosmetic products reference the information recorded in the distributed ledger.

BACKGROUND

The cosmetics industry has seen rapid growth and development worldwide, leading to an increased demand for effective measures to ensure product authenticity. Counterfeit cosmetics have flooded the market, creating significant problems for both brands and consumers. These counterfeit products often contain harmful ingredients and fail to meet safety standards, posing a risk to consumer health. They also lead to substantial financial losses for genuine manufacturers and sellers.

The traditional methods of verifying the authenticity of cosmetic products, such as holograms or unique serial numbers, have proved inadequate in addressing this escalating issue. Counterfeiters have evolved their methods to bypass such security measures, making it increasingly difficult for consumers to distinguish between authentic and counterfeit products.

Existing verification systems often rely on basic visual inspections or electronic systems that lack comprehensive security measures, making them prone to manipulation. They also fail to engage consumers in the verification process actively. Moreover, these systems often lack end-to-end traceability, complicating the recall process when defective or dangerous products are discovered.

SUMMARY

Techniques, systems, apparatuses, components, devices, and methods are disclosed for a cosmetic authenticity verification system that records representations of cosmetic products in a distributed ledger (e.g., blockchain) maintained by validating network nodes. For example, the manufacturer of a cosmetic product may mint a non-fungible token (NFT) representing a cosmetic product where the NFT includes identification information for the cosmetic product (e.g., characteristics of the cosmetic product, such as the name of the cosmetic product, the manufacturer of the cosmetic product, the serial number for the cosmetic product, an image of the cosmetic product, the manufacturing date of the cosmetic product, the facility where the cosmetic product was manufactured, a list of ingredients for the cosmetic product, the locations and/or sources of the ingredients, a batch number for the cosmetic product, an expiration date for the cosmetic product, etc.). Additionally or alternatively, the NFT may include a cryptographic hash value corresponding to the characteristics of the cosmetic product, where the characteristics of the cosmetic product are hashed according to a cryptographic hashing algorithm (e.g., SHA-256) which is a one-way function that cannot be reversed.

Then the cosmetic product or the packaging for the cosmetic product may include a unique identifier that references the representation of the cosmetic product (e.g., the NFT) in the distributed ledger. For example, a barcode, quick response (QR) code, Near Field Communication (NFC) tag, or Radio-Frequency Identification (RFID) tag may be embedded on the cosmetic product or the packaging for the cosmetic product.

In some implementations, the unique identifier is printed on the cosmetic product or packaging using ink resistant to cosmetic ingredients, such as a fade resistant ink. Also in some implementations, the unique identifier is printed with biodegradable ink. Still further, in some implementations, the unique identifier is tamper proof or at least tamper resistant. For example, an NFC or RFID tag may be embedded onto the cosmetic product or packaging such that it can only be applied once. Otherwise, the antenna breaks when attempting to remove it. In another example, the NFC or RFID tag may transmit a different message when the tag has been tampered with.

In some implementations, the cosmetic product includes one or more environmental sensors to detect environmental factors that could negatively impact the cosmetic product, such as a light sensor, a heat sensor, a moisture sensor, etc. The one or more environmental sensors may act as evidence oracles that transmit the sensor data to the distributed ledger or to the smart contract for the NFT representing the cosmetic product. The NFT may then be updated to include current product quality information indicative of the condition of the cosmetic product based on the sensor data. For example, when light exposure, heat exposure, or moisture exposure exceeds a first threshold, the condition of the cosmetic product may change from excellent to good. The smart contract may receive the sensor data or an indication of the changed condition and may update the NFT to include the updated condition.

In some implementations, the unique identifier may include a link to a web page that presents the identification information for the cosmetic product. For example, the web page may present the characteristics of the cosmetic product, such as the name of the cosmetic product, the manufacturer of the cosmetic product, the serial number for the cosmetic product, an image of the cosmetic product, the manufacturing date of the cosmetic product, the facility where the cosmetic product was manufactured, a list of ingredients for the cosmetic product, the locations and/or sources of the ingredients, a batch number for the cosmetic product, an expiration date for the cosmetic product, product quality information for the cosmetic product indicative of the condition of the cosmetic product, etc. The web page may also present a unique token identifier for the cosmetic product such as the token ID of the NFT and/or a smart contract address for the smart contract used to mint the NFT. Moreover, the web page may include a link to the NFT by for example, linking to a block explorer for viewing the NFT within the distributed ledger.

In other implementations, the unique identifier may include the identification information for the cosmetic product and/or the NFT without linking to a web page, such as when the unique identifier is an NFC tag or RFID tag.

Then to verify the authenticity of a cosmetic product, a purchaser of the cosmetic product may scan or communicate with the unique identifier via a makeup application executing on the purchaser's client device. The makeup application may be provided by the manufacturer of the cosmetic product. In any event, the makeup application may obtain the characteristics of the cosmetic product from the unique identifier and compare the characteristics from the unique identifier to the characteristics included in the NFT. For example, if the NFT includes a cryptographic hash value of the characteristics, the makeup application may calculate a cryptographic hash value of the characteristics from the unique identifier and compare the cryptographic hash values. If the cryptographic hash values match, the makeup application may verify the cosmetic product as authentic. Otherwise, the makeup application may identify the cosmetic product as a potential counterfeit.

Also in some implementations, to verify the authenticity of the cosmetic product, the makeup application may identify the ownership history of the NFT representing the cosmetic product from the distributed ledger. Using the ownership history, the makeup application may determine whether the creator or minter of the NFT is the manufacturer of the cosmetic product. For example, the makeup application may determine whether the wallet address for the creator or minter corresponds to a wallet address owned by the manufacturer. If the creator or minter of the NFT is not the manufacturer of the cosmetic product, the makeup application may identify the cosmetic product as a potential counterfeit.

Still further, the characteristics of the cosmetic product may be encrypted to prevent a counterfeiter from being able to easily read and duplicate the characteristics included in or referenced by the unique identifier. For example, the manufacturer may encrypt the characteristics of the cosmetic product using an encryption key. Then when the makeup application scans or communicates with the unique identifier, the makeup application may receive a decryption key from a manufacturer server device to decrypt the encrypted characteristics and calculate a cryptographic hash value of the decrypted characteristics to compare to a cryptographic hash value included in the NFT. In other implementations, the makeup application at the client device transmits the cryptographic hash value for the NFT and the encrypted characteristics of the cosmetic product to the manufacturer server device. The manufacturer server device then decrypts the encrypted characteristics and calculates a cryptographic hash value of the decrypted characteristics to compare to the cryptographic hash value for the NFT. Then the manufacturer server device transmits the results of the comparison to the makeup application.

By utilizing distributed ledgers and in some scenarios, smart contracts to verify the authenticity of cosmetic products, the cosmetic authenticity verification system maintains a trusted, secure, and immutable record of the cosmetic products. The trusted, secure, and immutable record also includes ownership information for the cosmetic products to track a chain of custody of the cosmetic products and/or the ingredients used to make the cosmetic products, and ensure that the manufacturer is who they say they are. For example, each manufacturer may be assigned an address which is identified in the blockchain network as corresponding to the manufacturer. A manufacturer that mints an NFT may need to provide a cryptographic proof-of-identity indicating that the owner is in possession of the private cryptographic key corresponding to the public cryptographic key for the particular address assigned to the manufacturer to prove the manufacturer is who they say they are. This prevents counterfeiting and reduces the likelihood of a customer purchasing a counterfeit product that contains harmful ingredients. The cosmetic authenticity verification system may flag potential counterfeits and alert the customer so that the customer does not use the potential counterfeit and risk injury.

Moreover, the cosmetic authenticity verification system in conjunction with the distributed ledger allows manufacturers to track ownership of their cosmetic products via owners of corresponding NFTs. If there is a product recall or other information that needs to be provided for a particular cosmetic product, the manufacturer may identity the owners via the distributed ledger and provide the recall or other information to them.

Still further, the cosmetic authenticity verification system may provide alerts to the makeup application when a cosmetic product is about to expire reminding the customer to use the cosmetic product before its expiration date, thereby enhancing customer safety. As the cosmetic product approaches the expiration date, the makeup application may also suggest to the customer to reorder the cosmetic product and may include user controls for reordering the cosmetic product.

One example embodiment of the techniques of this disclosure is a method for verifying authenticity of a cosmetic product using a distributed ledger maintained by a plurality of participants. The method includes generating a transaction including identification information for a cosmetic product indicating a manufacturer of the cosmetic product, and augmenting the transaction with a cryptographic signature from the manufacturer to prove the identity of the manufacturer. The method also includes transmitting the transaction to at least one other participant in a distributed ledger network of participants maintaining the distributed ledger. A unique identifier is embedded on the cosmetic product or on packaging for the cosmetic product that references the identification information for a cosmetic product in the distributed ledger.

Another example embodiment of the techniques of this disclosure is a method for monitoring a distributed ledger to verify authenticity of a cosmetic product. The method includes obtaining, by a client device, information from a unique identifier embedded on a cosmetic product or on packaging for the cosmetic product. The method also includes monitoring a distributed ledger for an indication of the cosmetic product, and verifying authenticity of the cosmetic product by comparing information regarding the cosmetic product in the distributed ledger to the obtained information from the unique identifier embedded on the cosmetic product or on the packaging for the cosmetic product.

Yet another example embodiment of the techniques of this disclosure is a client device for monitoring a distributed ledger to verify authenticity of a cosmetic product. The client device includes one or more processors, and a non-transitory computer-readable medium coupled to the one or more processors and storing instructions thereon. When executed by the one or more processors, the instructions cause the client device to obtain information from a unique identifier embedded on a cosmetic product or on packaging for the cosmetic product, monitor a distributed ledger for an indication of the cosmetic product, and verify authenticity of the cosmetic product by comparing information regarding the cosmetic product in the distributed ledger to the obtained information from the unique identifier embedded on the cosmetic product or on the packaging for the cosmetic product.

Another example embodiment of the techniques of this disclosure is a cosmetic product including a housing and a unique identifier embedded on the housing of the cosmetic product or on packaging for the cosmetic product. The unique identifier references identification information for the cosmetic product in a distributed ledger maintained by a plurality of participants to verify authenticity of the cosmetic product, and wherein the identification information includes a manufacturer of the cosmetic product.

DETAILED DESCRIPTION

Figure 1A:
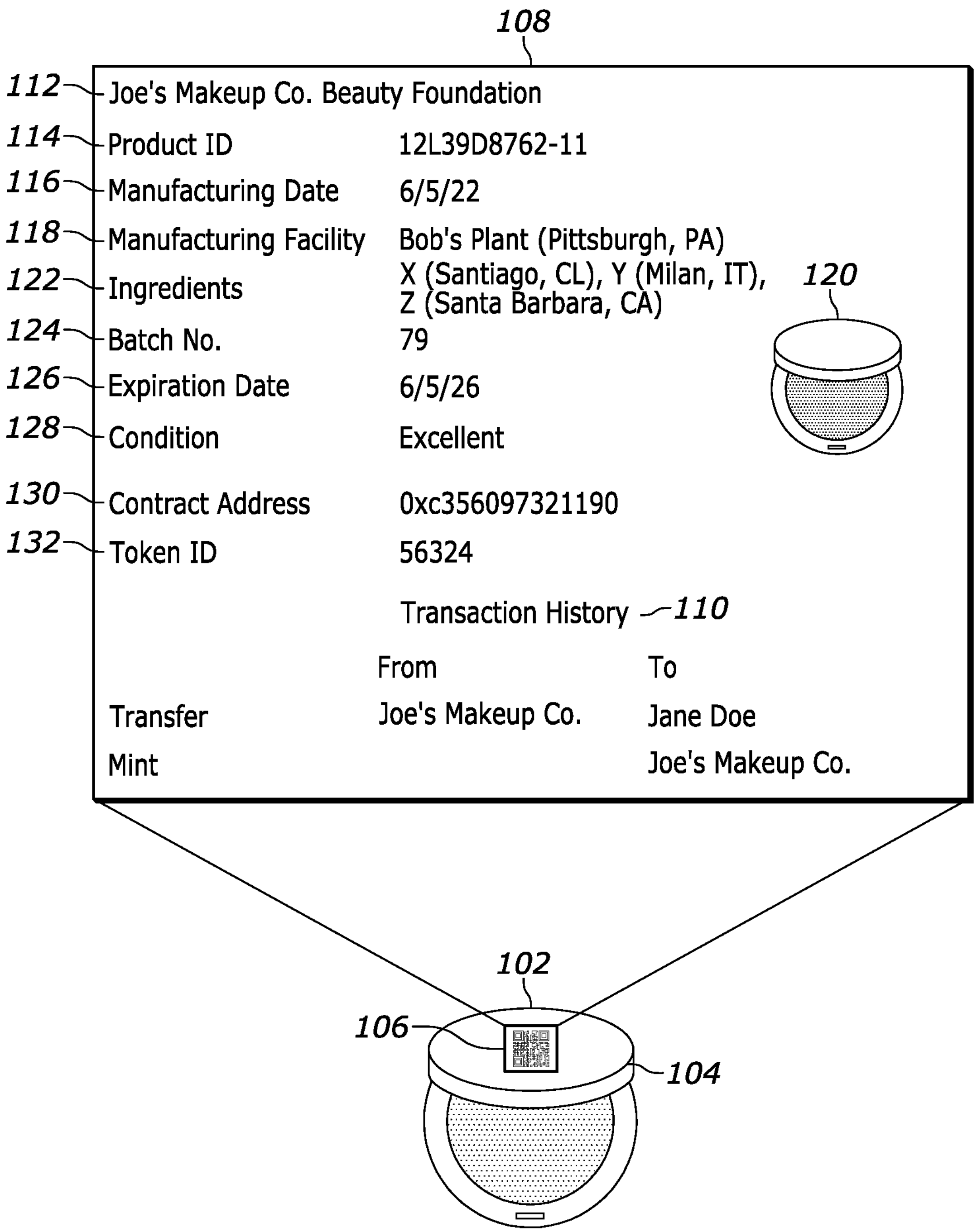
FIG. 1A illustrates an example cosmetic product having a unique identifier embedded on the housing of the cosmetic product that references identification information for the cosmetic product in a distributed ledger.

A distributed ledger is a storage mechanism for data, events, transactions, etc. that is maintained by several participants. More specifically, a distributed ledger is a way of achieving a distributed consensus on the validity or invalidity of information recorded in the distributed ledger. In other words, the distributed ledger provides decentralized trust to participants and observers. As opposed to relying on a central authority, a distributed ledger is a decentralized database in which a transactional record of changes to the ledger is maintained and validated by each node of a peer-to-peer network. One type of distributed ledger, a blockchain, is comprised of groupings of transactions organized together into a "block," and ordered sequentially (thus the term "blockchain"). While the distributed ledgers discussed herein are referred to in the context of a blockchain, this is merely one example of a distributed ledger. Distributed ledgers may also include a tangle, a block lattice, or other directed acyclic graph (DAG), for example. In any event, nodes may join and leave the blockchain network over time and may obtain blocks from peer nodes that were propagated while the node was gone. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirements and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes known to the validating node. If all of the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and the change is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

A smart contract is a computer protocol that enables the automatic execution and/or enforcement of an agreement between different parties. In particular, the smart contract may be computer code that is located at a particular address on the blockchain. In some cases the smart contract may run automatically in response to a participant in the blockchain sending funds (e.g., a cryptocurrency such as bitcoin, ether, or another digital/virtual currency) to the address where the smart contract is stored. Additionally, smart contracts may maintain a balance of the amount of funds that are stored at their address. In some scenarios when this balance reaches zero the smart contract may no longer be operational.

The smart contract may include one or more trigger conditions, that, when satisfied, correspond to one or more actions. For some smart contracts, the action(s) performed may be determined based upon one or more decision conditions. In some instances, data streams may be routed to the smart contract so that the smart contract may detect that a trigger condition has occurred and/or analyze a decision condition.

Blockchains may be deployed in a public, decentralized, and permissionless manner, meaning that any party may view the distributed ledger, submit new information to be added to the ledger, or join the network as a validating node. Other blockchains are private (e.g., permissioned ledgers)

that keep chain data private among a group of entities authorized to participate in the blockchain network. Other blockchain implementations may be both permissioned and permissionless whereby participants may need to be validated, but only the information that participants in the network wish to be public is made public.

In some implementations, a distributed ledger includes multiple blockchains such as a main blockchain and several side chains operating independently of the main blockchain. The side chains then interact with the main blockchain to provide some of the transaction data from the side chains to the main blockchain. In this manner, the side chains can be permissioned or private while the main blockchain is public or available to a larger number of entities than the side chains. Non-sensitive information from the side chains may be shared on the main blockchain. Also in some implementations, a distributed ledger includes multiple layers or separate blockchains executing in parallel that are maintained by the same validating nodes. Some of the transaction data from the blockchain for the first layer may be provided to the blockchain for the second layer or vice versa.

In some embodiments, the blockchain includes several blocks connected together to form a chain of blocks of transactions. To cryptographically link blocks and transactions together, each block in the blockchain organizes its transactions into a Merkle Tree. In a Merkle Tree each transaction is hashed according to a cryptographic hashing algorithm (e.g., SHA-256) and the resulting output hash is then combined with the hash of another transaction. Then the combined result is also hashed according to the cryptographic hashing algorithm. This output is then combined with the hash of two other transactions and this process is repeated until all of the transactions in the block are combined and hashed to generate a Merkle root that is used in the header for a block. If any single transaction in the block is tampered with, a different Merkle root would be generated since the Merkle root is a combination of the hashes of all of the transactions in the block.

In other words, the transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the node at the top of the tree or Merkle root, is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

To verify that a block is valid, a node may compare the Merkle root of the block to the Merkle root for the same block included in other nodes' copies of the blockchain. Thus, the Merkle root can be used as proof of the transactions included in the block and as proof that the contents of the block have not been tampered with if the Merkle root is the same in each node's copy of the block.

In one implementation, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash that was recorded on a blockchain on a certain date, then the blockchain provides cryptographic proof that the documents existed as of that date.

One way of storing a document on a blockchain is to broadcast a transaction including a hash of the document to the network, which will be included in a block if the transaction satisfies all of the consensus rules of the network. In some implementations, the blockchain is a permissioned ledger, meaning only authorized network participants may broadcast transactions. In other implementations, only some authorized network participants may make certain transactions. Only a cryptographic hash of the data may be included in the blockchain, such that the data may be verified using the blockchain even if it is obtained by a party off-chain.

Validating network nodes may verify that the signed transaction or signed message was signed by the private cryptographic key corresponding to the published public cryptographic key owned by the user generating the transaction. In at least one implementation, a valid proof-of-identity may be applied as a consensus rule by the blockchain network. As such, any transaction attempting to exchange an item or interact with a smart contract without a cryptographic proof-of-identity matching an identity authorized to exchange an item or interact with a smart contract is rejected by the network as non-compliant with the consensus rule. Each owner may be assigned a public key/private key pair which is identified in the blockchain network as corresponding to the owner. If the validating network nodes receive a transaction that is not from an authorized owner, the validating network nodes reject the transaction.

For example, if the owner of a particular address corresponding to a public cryptographic key submits a transaction to transfer an NFT to another owner at another address, the transaction must include a cryptographic proof-of-identity indicating that the owner is in possession of the private cryptographic key corresponding to the public cryptographic key for the particular address. This proves that the owner is in possession of the digital tokens at the particular address and is able to transfer the NFT from the particular address.

In one example, a distributed ledger in a cosmetic authenticity verification system may be maintained by validating nodes which transmit data to remote systems using one or more public and/or private networks, such as a private enterprise network, the Internet, a satellite, a cellular router, a backhaul Internet or other type backhaul connection. The validating nodes receive transactions broadcasted to the distributed ledger network by, for example, user devices. The nodes then validate the broadcasted transactions.

In another example, the validating nodes execute code contained in "smart contracts" and other devices act as "evidence oracles" which provide evidence related to product quality information, for example, to the blockchain. Oracles may be systems, devices, or entities that connect a deterministic system with a non-deterministic system or data source.

In the following description, for the purposes of explanation, specific details are set forth in order to provide a thorough understanding of various implementations and examples. Various implementations may be practiced without these specific details. The figures and description are not intended to be restrictive.

FIG. 1A illustrates an example cosmetic product 102 having a housing 104 and a unique identifier 106 embedded on the housing 104 of the cosmetic product 102. The cosmetic product 102 may be moisturizer, primer, foundation, concealer, face powder, rouge, blush, lipstick, lip balm, lip gloss, eyebrow pencils, eyeliner, mascara, highlighter, setting spray, setting powder, eye shadow, complexion cream, contour cream, contour powder, nail polish, makeup remover, or any suitable makeup or other cosmetic product.

The unique identifier 106 may be an alphanumeric code for uniquely identifying the cosmetic product 102 or a device that transmits alphanumeric data for uniquely identifying the cosmetic product 102, such as a barcode (which may be one-dimensional or two-dimensional), QR code, NFC tag, RFID tag, etc. The unique identifier 106 may include a link to a web page 108 that presents identification information for the cosmetic product 102. For example, the web page 108 may present the characteristics of the cosmetic product 102, such as the name and manufacturer 112 of the cosmetic product 102, the serial number 114 for the cosmetic product 102, an image 120 of the cosmetic product 102, the manufacturing date 116 of the cosmetic product 102, the facility 118 where the cosmetic product 102 was manufactured, a list of ingredients 122 for the cosmetic product 102, the locations and/or sources of the ingredients, a batch number 124 for the cosmetic product 102, an expiration date 126 for the cosmetic product 102, the condition 128 of the cosmetic product 102, etc. The web page 108 may also present a unique token identifier for the cosmetic product 102 such as the token ID 132 of the NFT and/or a smart contract address 130 for the smart contract used to mint the NFT.

Additionally, the web page 108 may present the transaction history 110 for the NFT according to the distributed ledger. For example, the transaction history 110 may indicate that the NFT was minted by Joe's Makeup Co. and then transferred to Jane Doe, for example upon purchase of the product by Jane Doe.

In other implementations, the unique identifier 106 may include the identification information for the cosmetic product 102 and/or the NFT without linking to a web page 108, such as when the unique identifier is an NFC tag or RFID tag.

In some implementations, the unique identifier 106 is printed on the cosmetic product 102 using ink resistant to cosmetic ingredients, such as a fade resistant ink. Also in some implementations, the unique identifier 106 is printed with biodegradable ink. Still further, in some implementations, the unique identifier is tamper proof or at least tamper resistant. For example, an NFC or RFID tag may be embedded onto the cosmetic product 102 such that it can only be applied once. Otherwise, the antenna breaks when attempting to remove it. In another example, the NFC or RFID tag may transmit a different message when the tag has been tampered with.

In some implementations, the cosmetic product 102 includes one or more environmental sensors to detect environmental factors that could negatively impact the cosmetic product 102, such as a light sensor, a heat sensor, a moisture sensor, etc. The one or more environmental sensors may act as evidence oracles that transmit the sensor data to the distributed ledger or to the smart contract for the NFT representing the cosmetic product. The one or more environmental sensors also may transmit the sensor data to the unique identifier 106 or a computing device to update the identification information for the cosmetic product 102, for example on the web page 108.

Figure 1B:
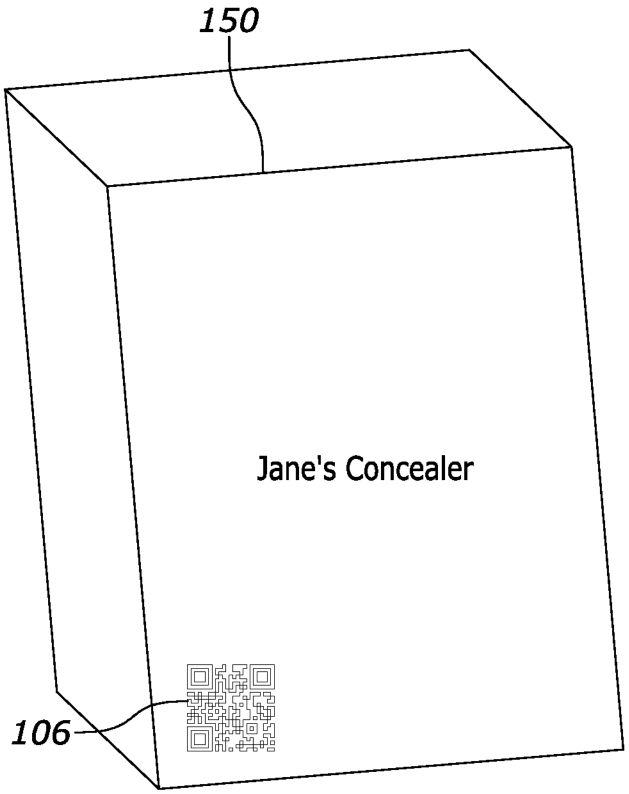
FIG. 1B illustrates example cosmetic product packing having a unique identifier embedded on the packaging that references identification information for the cosmetic product in a distributed ledger.

Additionally or as an alternative to embedding the unique identifier 106 on the cosmetic product 102, the unique identifier 106 may be embedded on the packaging for the cosmetic product 102. FIG. 1B illustrates example cosmetic product packaging 150 the unique identifier 106 embedded on the packaging 150.

Figure 2:
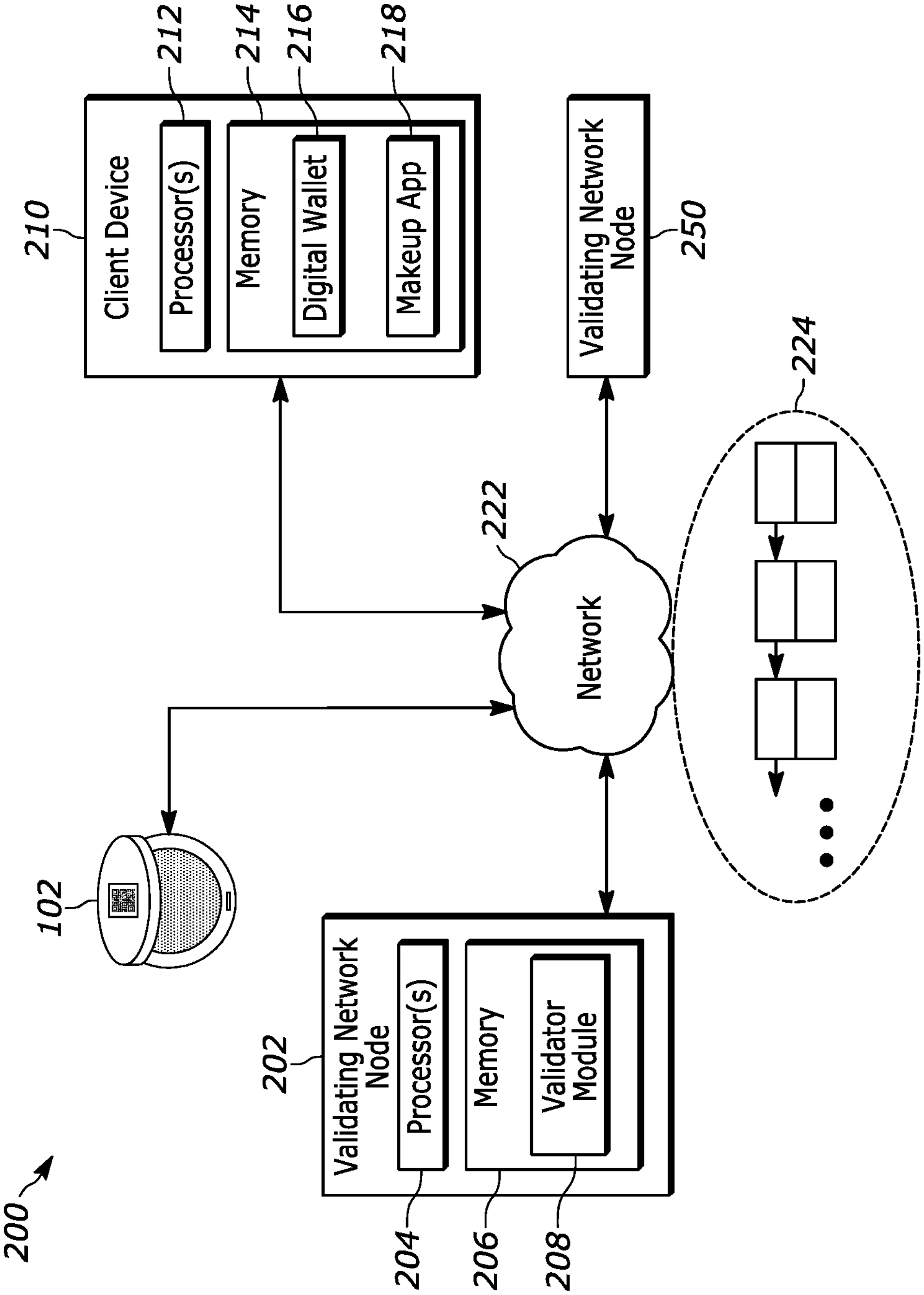
FIG. 2 illustrates a block diagram of a computer network and system on which a cosmetic authenticity verification system may operate in accordance with an example aspect of the present disclosure.

FIG. 2 illustrates various aspects of an example cosmetic authenticity verification system 200. The cosmetic authenticity verification system 200 may include validating network nodes 202, 250, cosmetic products 102, and client devices 210 which may be communicatively connected through a network 222 as described below. According to embodiments, the validating network nodes 202, 250 may be a combination of hardware and software components, also as described in more detail below with reference to FIG. 5. The validating network nodes 202, 250 may each include a memory 206, one or more processors 204 such as a microcontroller or a microprocessor, and other components not shown in FIG. 2 (e.g., a random-access memory (RAM), and/or an input/output (I/O) circuit), all of which may be interconnected via an address/data bus.

The memory 206 and/or RAM may store various applications for execution by the one or more processors 204. For example, a user interface application may provide a user interface to the validating network node 202, which user interface may, for example, allow the system administrator to configure, troubleshoot, and/or test various aspects of the node's operation.

The memory 206 may be tangible, non-transitory memory and may include any types of suitable memory modules, including RAM, read-only memory (ROM), flash memory, other types of persistent memory, etc. The memory 206 may store, for example, instructions executable on the processors 204 for a validator module 208.

The validator module 208 may validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain.

Another consensus rule may require that blocks and transactions adhere to format requirements and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

The validator module 208 may append distributed ledger data to the distributed ledger if the distributed ledger data satisfies the consensus rules by generating a new block of validated transactions to include in the distributed ledger 224 and/or by broadcasting a block of transactions to other network nodes. Otherwise, the validator module 208 disregards any distributed ledger data that does not satisfy the consensus rules, and the distributed ledger data is not propagated to other network nodes.

The client device 210 may include, by way of example, a tablet computer, a cell phone, a personal digital assistant (PDA), a mobile device smart-phone also referred to herein as a "mobile device," a laptop computer, a desktop computer, a portable media player, a wearable computing device, smart glasses, smart watches, phablets, other smart devices, devices configured for wired or wireless RF (Radio Frequency) or optical communication, etc. Of course, any network-enabled device appropriately configured may interact with the cosmetic authenticity verification system 200. The client device 210 need not necessarily communicate with the network 222 via a wired connection. In some instances, the client device 210 may communicate with the network 222 via wireless signals and, in some instances, may communicate with the network 222 via an intervening wireless or wired device, which may be a wireless router, a wireless repeater, a base transceiver station of a mobile telephony provider, an optical communications device, etc.

The client device 210 may include a memory 214, one or more processors 212 such as a microcontroller or a microprocessor, and other components not shown in FIG. 1 (e.g., a display, a communication unit, a user-input device, a RAM, and/or an I/O circuit), all of which may be interconnected via an address/data bus. The memory 214 may include an operating system, a data storage, a plurality of software applications, and/or a plurality of software routines. The operating system, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage may include data such as user profiles, application data for the plurality of applications, routine data for the plurality of routines, and/or other data necessary to interact with the validating network nodes 202, 250 through the digital network 222. In some embodiments, the one or more processors 212 may also include, or otherwise be communicatively connected to, other data storage mechanisms (e.g., one or more hard disk drives, optical storage drives, solid state storage devices, etc.) that reside within the client device 210.

The communication unit may communicate with the validating network nodes 202, 250 via any suitable wireless communication protocol network, such as a wireless telephony network (e.g., GSM, CDMA, LTE, etc.), a Wi-Fi network (802.11 standards), a WiMAX network, a Bluetooth network, etc.

The user-input device may include a "soft" keyboard that is displayed on the display of the client device 210, an external hardware keyboard communicating via a wired or a wireless connection (e.g., a Bluetooth keyboard), an external mouse, or any other suitable user-input device.

The one or more processors 212 may be adapted and configured to execute any one or more of the plurality of software applications and/or any one or more of the plurality of software routines residing in the memory, in addition to other software applications. One of the plurality of applications may be a client application that may be implemented as a series of machine-readable instructions for performing the various tasks associated with receiving information at, displaying information on, and/or transmitting information from the client device 210.

One of the plurality of applications may be a native application and/or web browser, such as Apple's Safari®, Google Chrome™, Microsoft Internet Explorer®, and Mozilla Firefox® that may be implemented as a series of machine-readable instructions for receiving, interpreting, and/or displaying web page information while also receiving inputs from the user. Another application of the plurality of applications may include an embedded web browser that may be implemented as a series of machine-readable instructions for receiving, interpreting, and/or displaying web page information. One of the plurality of routines may include a verification routine which scans or communicates with the unique identifier embedded on a cosmetic product or packaging to obtain characteristics of the cosmetic product and compare the characteristics from the unique identifier to characteristics included in an NFT representing the cosmetic product.

In some scenarios, to mint an NFT representing a cosmetic product 102, a user such as a manufacturer may generate a transaction via the client device 210. The transaction may include an originator such as the manufacturer (identified by a cryptographic proof-of-identity and a blockchain address for the manufacturer). The transaction may include an indication of a smart contract address for interacting with a smart contract associated with cosmetic product NFTs, an indication that the transaction is for minting a new cosmetic product NFT, and the metadata for the cosmetic product NFT including the characteristics of the cosmetic product. The manufacturer signs the transaction with a cryptographic signature unique to the manufacturer and augments the transaction with identity data for the manufacturer such as a public cryptographic key owned by the manufacturer. For example, the transaction may be signed by a private cryptographic key corresponding to the public cryptographic key owned by the manufacturer.

Then the client device 210 transmits the transaction to one of the validating nodes 202, 250 in the distributed ledger network. The validating node 202, 250 may then confirm the transaction is valid, add the transaction to a block of transactions, solve a cryptographic puzzle, and include the solution in the newly generated block as proof of the work done to generate the block. The validating node 202, 250 may then provide the newly generated block to each of the other validating nodes in the distributed ledger network to include the newly generated block in their respective copies of the distributed ledger.

In some embodiments, the validating node 202, 250 confirms the transaction against a set of consensus rules and adds the transaction to a block when the transaction satisfies each of the consensus rules.

Then the manufacturer may include identification information for the NFT (e.g., the token ID, the smart contract address, the blockchain used to mint the NFT, etc.) in the unique identifier 106 embedded on the cosmetic product 102 and/or the web page referenced by the unique identifier 106.

In some implementations, the manufacturer, via the client device 210, may generate a smart contract for minting, exchanging, or modifying NFTs representing cosmetic products. For example, the smart contract may follow the ERC-721 standard.

More specifically, the smart contract may include a mint function for minting a new cosmetic product NFT. The mint function may require a minter to provide the characteristics of the cosmetic product and include a blockchain address for the minter and a cryptographic signature providing proof that the minter is the owner of the address.

The smart contract may also include a transfer function for transferring the NFT from one user to another (e.g., from the manufacturer to a purchaser of the cosmetic product). The transfer function may require the transferor to provide identification information for the NFT to be transferred, a blockchain address of the transferee receiving the NFT, and a cryptographic signature from the transferor providing proof that the transferor agreed to initiate the transfer.

Still further, the smart contract may include a modification function for modifying the metadata for the NFT, such as a characteristic of the cosmetic product and/or the cryptographic hash value determined based on the characteristics of the cosmetic product. For example, the modification function may receive sensor data from an environmental sensor on the cosmetic product acting as an evidence oracle.

The modification function may require a proof of identity (via a cryptographic signature) that the sensor data came from the environmental sensor on the cosmetic product. The modification function may then compare the sensor data to one or more predetermined thresholds and determine current product quality information indicative of the condition of the cosmetic product based on the comparison. In other implementations, the environmental sensor performs the comparison and provides an indication of the current product quality information to the modification function. Then the modification function may modify the condition of the cosmetic product included in the metadata for the NFT based on the current product quality information.

In any event, the client device 210 may deploy the smart contract to an address stored on the distributed ledger (the smart contract address).

In some implementations, in addition to generating transactions that include identification information for cosmetic products, transactions may be generated that include identification information for the source or supplier of ingredients used to make the cosmetic product. For example, the source of an ingredient may mint an NFT representing the ingredient where the NFT includes identification information for the ingredient (e.g., characteristics of the ingredient, such as the name of the ingredient, the source of the ingredient, the facility where the ingredient was manufactured, etc.). The cosmetic product NFT may include references to ingredient NFTs for each of the ingredients in the cosmetic product NFT.

When an ingredient is delivered from one entity to another, the delivering entity may generate a transaction indicating a transfer of the ingredient NFT to the receiving entity to maintain a chain of custody for each of the ingredients used to make the cosmetic product. Then the client device 210 may monitor the distributed ledger to verify that each of the ingredients listed for the cosmetic product were provided to the manufacturer according to the ownership history of the ingredient NFTs.

In some scenarios, to verify authenticity of a cosmetic product, a user such as customer purchasing a cosmetic product may launch a makeup application 218 from the client device 210. The makeup application 218 may obtain a user profile for the user, for example when the user logs into the makeup application 218 via a username and password. The makeup application 218 may also scan and/or communicate with the unique identifier 106 embedded on the cosmetic product 102 to obtain the characteristics of the cosmetic product 102 and the NFT, and compare the characteristics of the cosmetic product 102 to the metadata for the NFT. For example, if the metadata includes a first cryptographic hash value of the characteristics, the makeup application 218 may calculate a second cryptographic hash value of the characteristics from the unique identifier 106 and compare the first and second cryptographic hash values.

In some implementations, the characteristics are encrypted by the manufacturer using an encryption key. The makeup application 218 may transmit a request to a manufacturer server device for the decryption key and may receive the decryption key from the manufacturer server device to decrypt the characteristics. In other implementations, the manufacturer server device decrypts the characteristics, performs the comparison, and provides the results back to the makeup application 218. For example, the manufacturer server device may transmit an indication that the authenticity of the cosmetic product has been verified in response to the manufacturer server device determining that the first and second cryptographic hash values match.

Moreover, the makeup application 218 may verify that the minter of the NFT is the manufacturer of the cosmetic product 102 according to the transaction history for the NFT. For example, the makeup application 218 may determine whether the wallet address for the minter corresponds to a wallet address owned by the manufacturer.

Figure 6A:
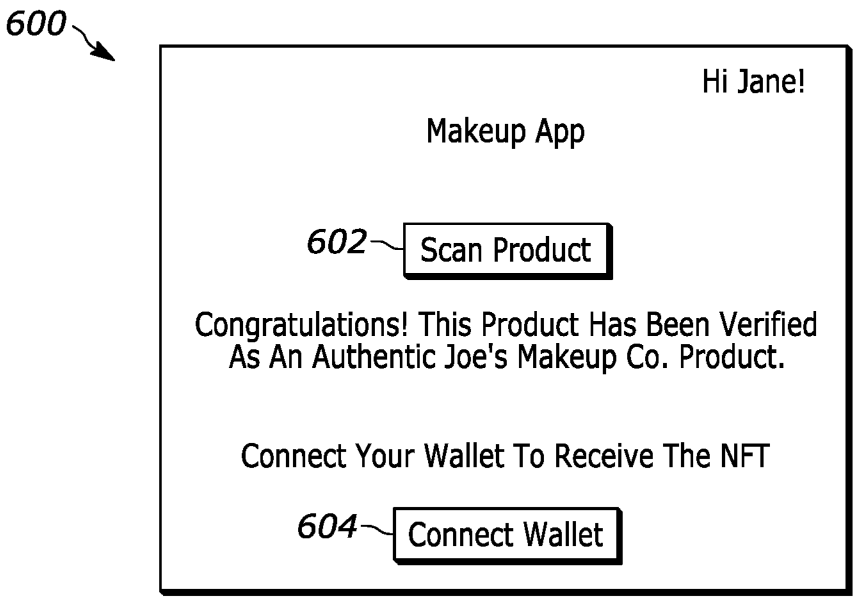
FIG. 6A illustrates an example display of a makeup application which may be presented on the user interface of a client device.

In response to determining that the cryptographic hash values match and that the minter is the manufacturer of the cosmetic product 102, the makeup application 218 may verify the authenticity of the cosmetic product as shown in FIG. 6A.

Otherwise, the makeup application 218 may flag the cosmetic product 102 as a potential counterfeit. The makeup application 218 may then provide an alert to the user on the display of the client device 210 indicating that the cosmetic product 102 is a potential counterfeit and instructing the user not to use the cosmetic product. The makeup application 218 may also transmit a message to the manufacturer server device reporting the potential counterfeit and providing information about the potential counterfeit to the manufacturer server device so that the manufacturer is aware of these potential counterfeits in the marketplace.

FIG. 6A illustrates an example display 600 of the makeup application 218 which may be presented on the user interface of the client device 210. The display 600 may include a first user control 602 for scanning the unique identifier 106 embedded on the cosmetic product or packaging. In response to the user selecting the first user control 602, the wallet application 218 may activate a camera at the client device 210 to capture an image of the unique identifier 106, for example when the unique identifier 106 is a barcode or QR code. In other implementations, such as when the unique identifier 106 is an NFC tag or RFID tag, the wallet application 218 may transmit a signal to the unique identifier 106 to energize the unique identifier 106 and request the identification information provided by the NFC tag or RFID tag.

In response to capturing an image of the unique identifier 106, the makeup application 218 may decode the information encoded by the unique identifier and may determine that the information is a link to a web page. The makeup application 218 may then present the web page for display to the user. In other implementations, the makeup application 218 may receive the identification information provided by the unique identifier 106 which includes characteristics of the cosmetic product and identification information for an NFT corresponding to the cosmetic product.

In response to verifying the authenticity of the cosmetic product, the makeup application 218 may prompt the user to connect a digital wallet application 216 to the makeup application 218 to receive the NFT at a blockchain address maintained by the digital wallet application 216. As shown in FIG. 6A, the display 600 includes a second user control 604 for connecting a digital wallet application 216 to the makeup application 218.

Figure 6B:
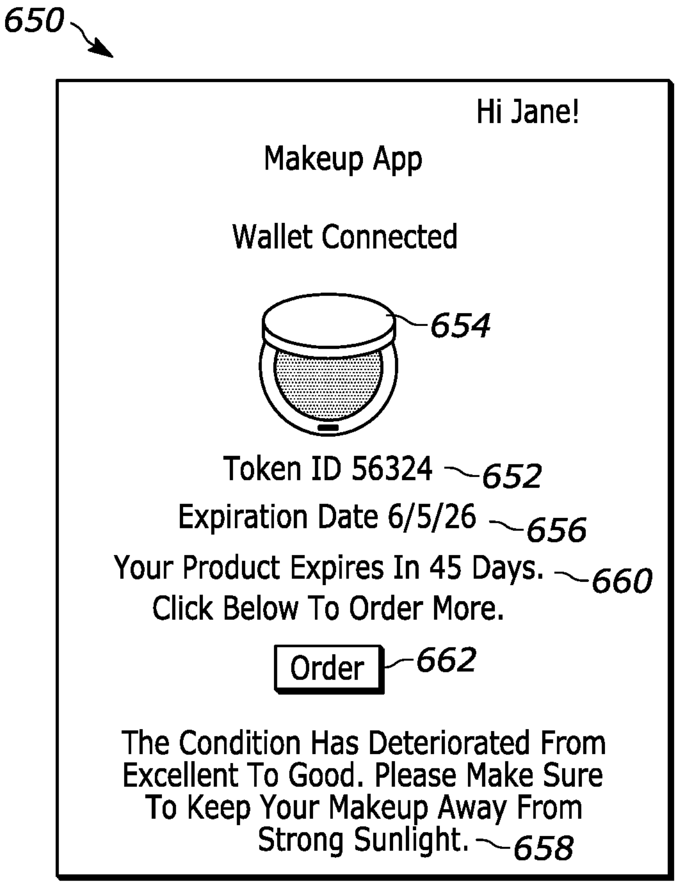
FIG. 6B illustrates another example display of a makeup application which may be presented on the user interface of a client device.

In response to connecting the digital wallet application 216 by for example, providing a cryptographic signature for the blockchain address maintained by the digital wallet application 216, the NFT may be transferred to the user as shown in FIG. 6B. FIG. 6B illustrates another example display 650 of the makeup application 218 after the user connects their wallet to the makeup application 218 and receives the cosmetic product NFT at a blockchain address maintained by the digital wallet application 216. The display 650 may include identification information for the cosmetic product NFT, such as a token ID 652, and metadata for the cosmetic product NFT including characteristics of the cosmetic product, such as an image of the cosmetic product 654, an expiration date for the cosmetic product 656, the condition of the cosmetic product 658, etc. Additionally, the display 650 may include an alert 660 that the cosmetic product 102 is expiring in the near future, and a third user control 662 for reordering the cosmetic product 102. Furthermore, the condition of the cosmetic product 658 may also include a recommendation on how to prevent the condition from deteriorating further, by for example keeping the cosmetic product 102 away from strong sunlight.

The makeup application 218 may also analyze information from the user profile for the user and may analyze the cosmetic product's ingredients to provide detailed information about the cosmetic product's ingredients, their benefits, and potential allergens. The user profile may include information regarding the user's allergies. The makeup application 218 may analyze the user profile to determine whether the user may be allergic to one of the ingredients and may provide an alert on the display 650 warning the user about the potential allergen.

Turning back to FIG. 2, it will be appreciated that although only one client device 210, one cosmetic product 102, and two validating network nodes 202, 250 are depicted, any suitable number of client devices 110, cosmetic products 102, and validating network nodes 202, 250 may be included in the cosmetic authenticity verification system. In some instances, client device 210 may also operate as a validating network node 202, 250 and/or validating network nodes 202, 250 may also operate as client devices 210.

The client device 210 and validating network nodes 202, 250 may communicate with each other via the network 222. The digital network 222 may be a proprietary network, a secure public Internet, a virtual private network and/or some other type of network, such as dedicated access lines, plain ordinary telephone lines, satellite links, a wireless telephony network, combinations of these, etc. Where the digital network 222 comprises the Internet, data communication may take place over the digital network 222 via an Internet communication protocol.

Figure 3:
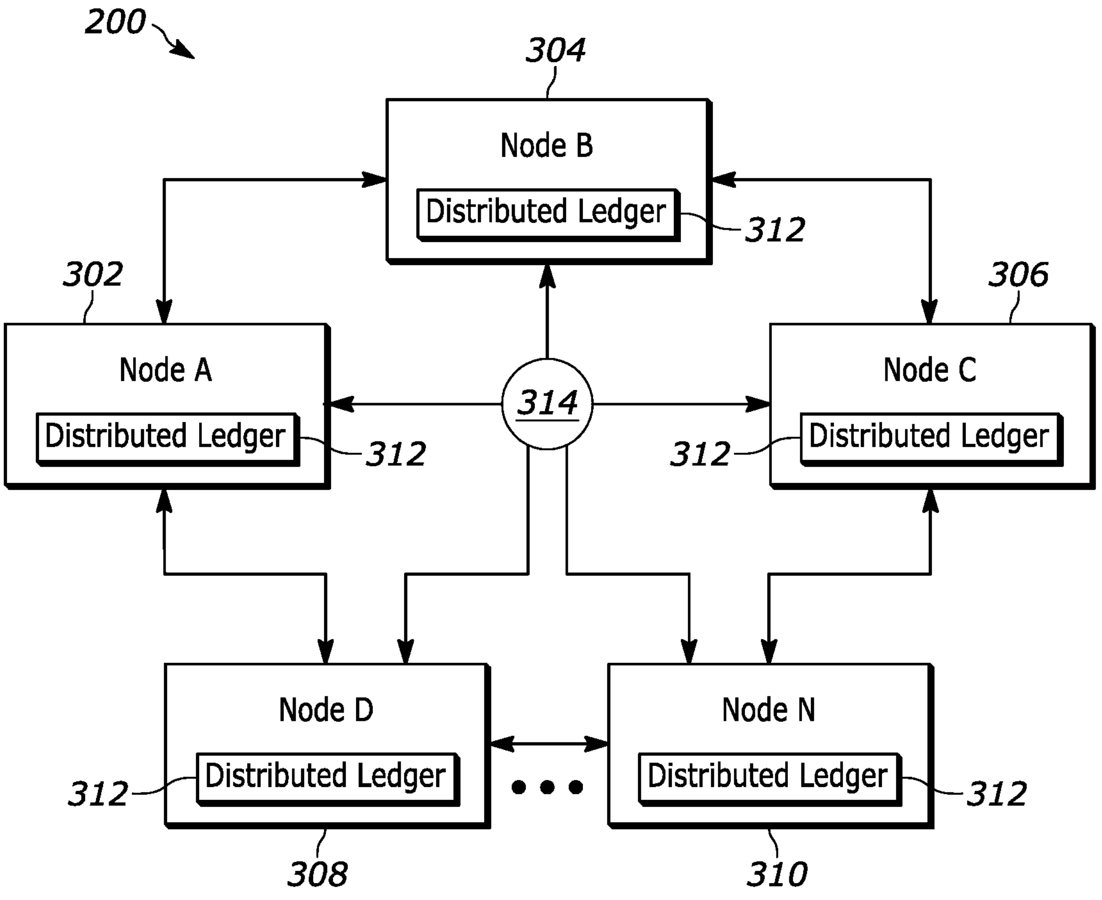
FIG. 3 illustrates an exemplary distributed ledger network for recording transactions and executing smart contracts in a cosmetic authenticity verification system.

FIG. 3 depicts an exemplary distributed ledger system 300 for recording transactions and executing smart contracts in a cosmetic authenticity verification system 200. The system 300 includes a distributed ledger 312 (e.g., having one or more distributed ledger layers) and a plurality of nodes 302, 304, 306, 308, and 310 (e.g., each similar to node 202 or 250 of FIG. 2). Each node maintains a copy of the distributed ledger 312. As changes are made to the distributed ledger 312, each node receives the change via the network 314 and updates its respective copy of the distributed ledger 312. A consensus mechanism may be used by the nodes 302-310 in the distributed ledger system 300 to decide whether it is appropriate to make received changes to the distributed ledger 312 or to a particular layer of the distributed ledger 312.

Each node in the system therefore has its own copy of the distributed ledger 312, which is identical to every other copy of the distributed ledger 312 stored by the other nodes. The distributed ledger system 300 may be more robust than a central authority database system because of the distributed ledger's decentralized nature. As such, there is no single point of failure on the distributed ledger system 300 as there would be in a centralized system.

Figure 4:
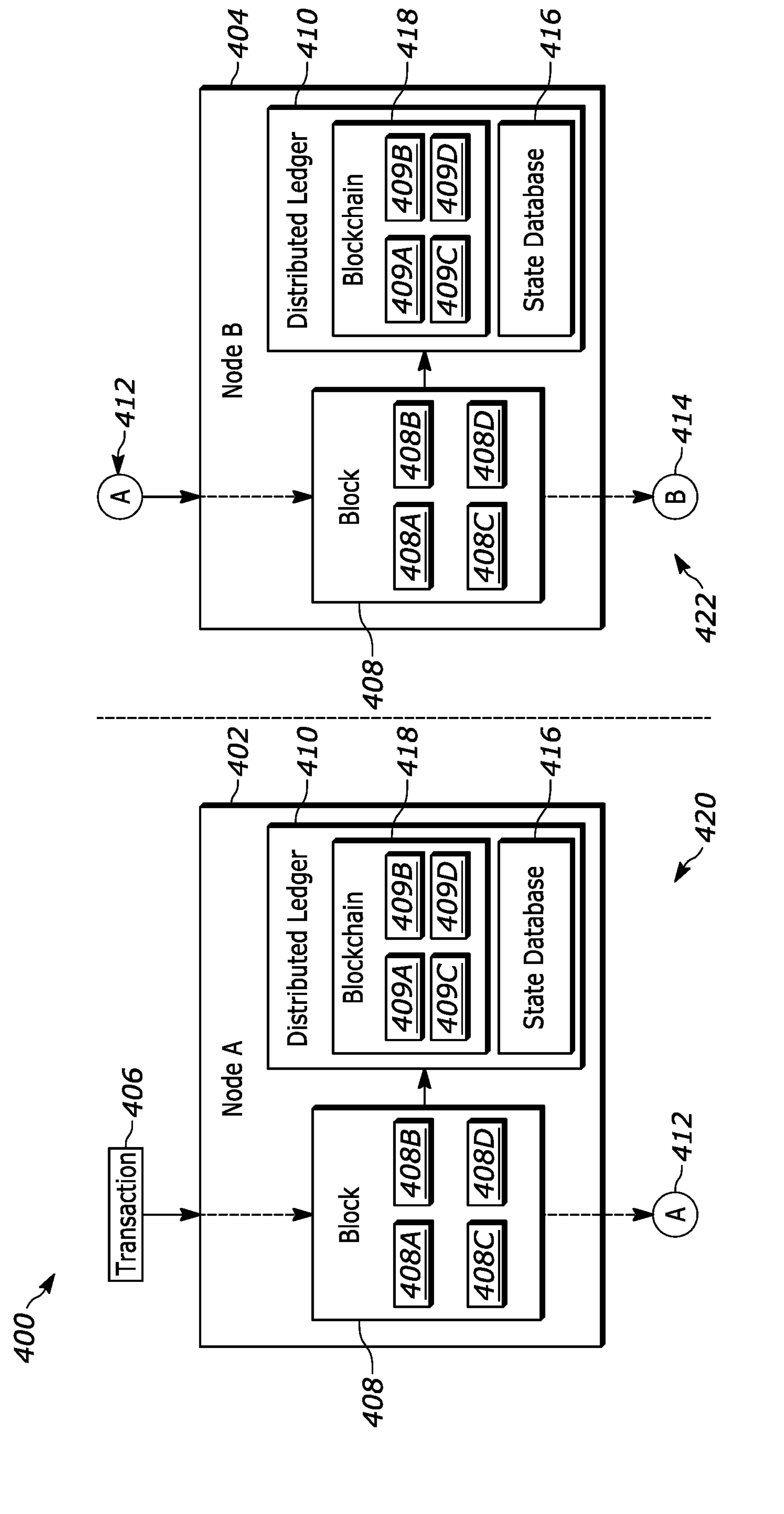
FIG. 4 illustrates exemplary validating network nodes and an exemplary transaction flow on a distributed ledger network in a cosmetic authenticity verification system.

FIG. 4 depicts exemplary validating network nodes and an exemplary transaction flow 400 on a distributed ledger network for resolving transactions. FIG. 4 includes two time frames 420 and 422 represented by the left and right sides of the dotted line, respectively, Node A 402 (e.g., node 202) and Node B 404 (e.g., node 250), a set of transactions 408A-408D, a set of blocks of transactions 409A-409D, a distributed ledger 410, and a blockchain 418.

The block propagation flow 400 may begin with Node A 402 receiving transaction 406 at time 420. When Node A 402 confirms that transaction 406 is valid, Node A 402 may add the transaction to a newly generated block 408. As part of adding the transaction 406 to block 408, Node A 402 may solve a cryptographic puzzle and include the solution in the newly generated block 408 as proof of the work done to generate the block 408. Alternatively, a proof of stake algorithm may be used to generate the block 408, whereby Node A 402 "stakes" an amount of a digital token used on the network, however, the network itself determines the node that will mint the new block. In another implementation, a proof of authority (PoA) algorithm may be used to generate the block 408, where transactions and blocks are validated by approved accounts, known as validators which run software allowing them to record transactions in the distributed ledger.

In other embodiments, the transaction 406 may be added to a pool of transactions until a sufficient number of transactions in the pool exist to form a block or distributed ledger entry. Node A 402 may transmit the newly created distributed ledger entry 408 to the network at time 412. Before or after propagating the distributed ledger entry 408, Node A 402 may add the distributed ledger entry 408 to its copy of the distributed ledger 418.

While proof of work, proof of stake, and proof of authority are described herein as consensus algorithms for selecting a node to mint a new block, these are merely a few example consensus algorithms and are not intended to be limiting. Additional consensus algorithms may be utilized, such as delegated proof of stake where nodes elect a subset of nodes referred to as delegates to perform validation, and the delegates take turns minting new blocks. Consensus algorithms may also include proof of weight, Byzantine fault tolerance, tangle consensus algorithms, block lattice consensus algorithms, etc. Additionally, quorum slices may be selected where a quorum is a set of nodes that participate in the consensus protocol and a quorum slice is its subset that helps a node in its agreement process. Individual trust decisions may be made by participants in the distributed ledger network to construct a quorum slice. Still further, security circles may be identified which are closed groups of network participants who together can form a quorum to reach a consensus on a transaction and to make further trust decisions.

In any event, the transactions 409A-409D may include updates to a state database 416. The state database 416 may contain current values of variables created by smart contracts deployed on the distributed ledger 418. Validated distributed ledger entries, such as distributed ledger entry 408, may include transactions effecting state variables in state database 416. At time 422, Node B 404 may receive the newly created distributed ledger entry 408 via the network at 412. Node B 404 may verify that the distributed ledger entry 408 is valid by checking the solution to the cryptographic puzzle provided in the distributed ledger entry 408. If the solution is accurate, then Node B 404 may add the distributed ledger entry 408 to its distributed ledger 418 and make any updates to the state database 416 as rejected by the transactions in distributed ledger entry 408. Node B 404 may then transmit the distributed ledger entry 408 to the rest of the network at time 414.

Figure 5:
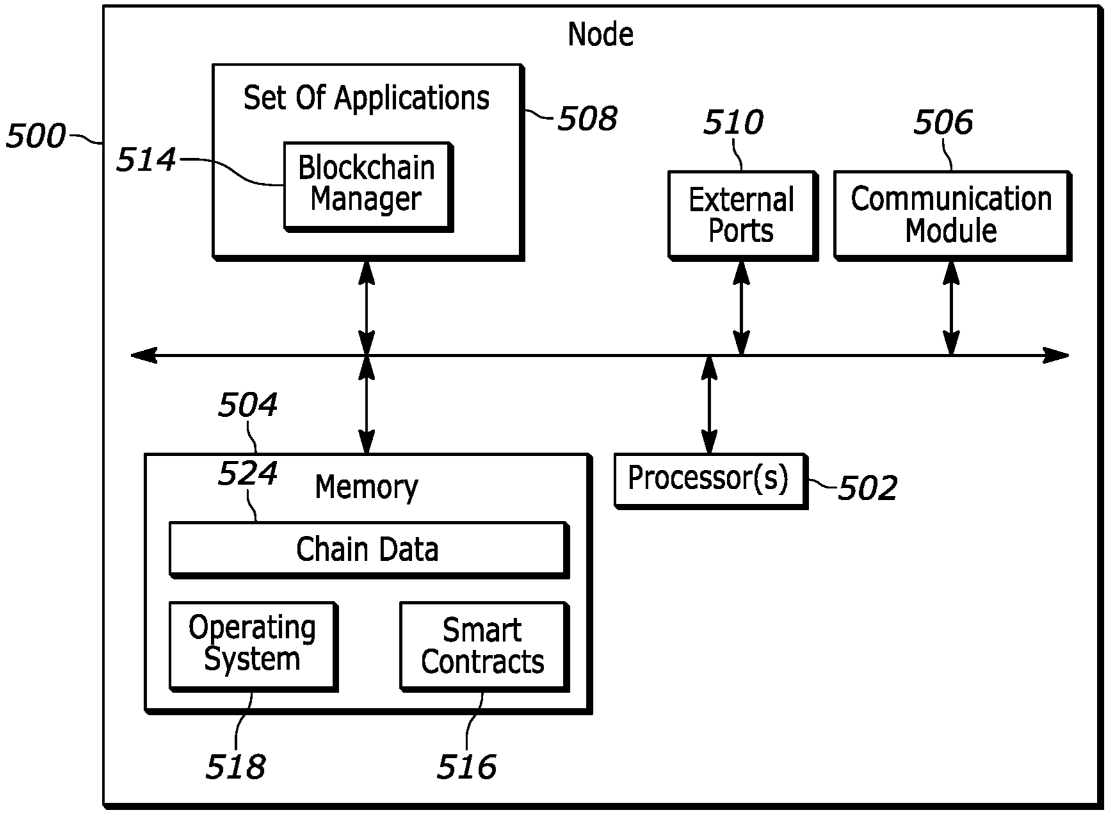
FIG. 5 illustrates exemplary components of a network node on a distributed ledger network in a cosmetic authenticity verification system.

FIG. 5 depicts exemplary components of a validating network node 500 on a distributed ledger network for recording transactions and executing smart contracts in a cosmetic authenticity verification system. The validating network node 500 may be similar to the validating network nodes 202, 250 described above with reference to FIG. 2. Node 500 may include at least one processor 502, memory 504, a communication module 506 such as a transceiver, a set of applications 508, external ports 510, a blockchain manager 514, smart contracts 516, and an operating system 518. In some embodiments, the node 500 may generate a new block of transactions or may broadcast transactions to other network nodes via the transceiver 506 by using the blockchain manager 514. Similarly, the node 500 may use the blockchain manager 514 in conjunction with the smart contracts 516 stored in the memory 504 to execute the functionality disclosed herein. The memory 504 may further include chain data 524 including, for example, a state database of the blockchain for storing states of smart contracts deployed thereon.

In other embodiments, the smart contracts 516 operate independent of the blockchain manager 514 or other applications. In some embodiments, the node 500 does not have a blockchain manager 514, or smart contracts 516 stored at the node. In some embodiments, the node 500 may have additional or fewer components than described.

Figure 7:
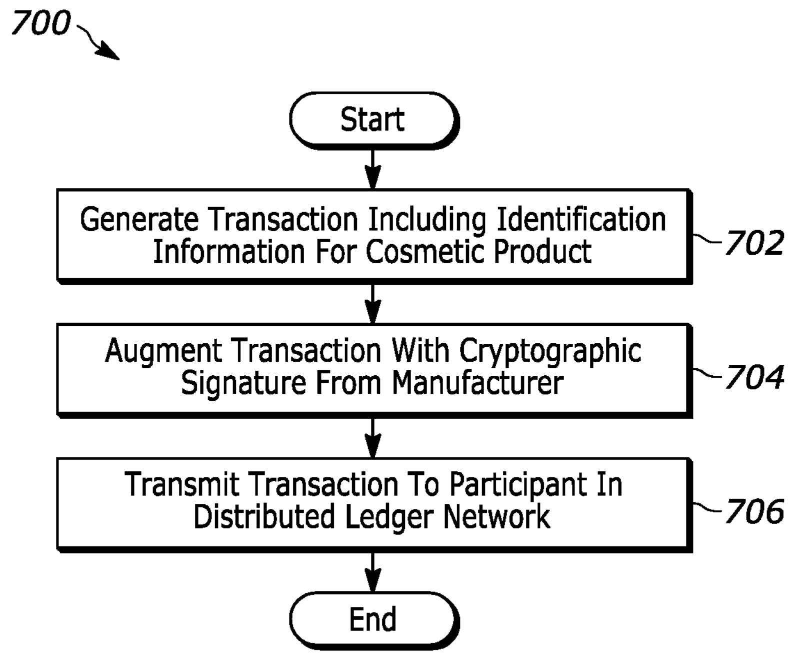
FIG. 7 illustrates a flow diagram of an example method for verifying authenticity of a cosmetic product using a distributed ledger.

FIG. 7 illustrates a flow diagram of an example method 700 for verifying authenticity of a cosmetic product using a distributed ledger. The method 700 may be executed by a client device 210 of a manufacturer of a cosmetic product.

At block 702, a transaction is generated that includes identification information for a cosmetic product. The identification information may include characteristics of the cosmetic product, such as the name of the cosmetic product, the manufacturer of the cosmetic product, the serial number for the cosmetic product, an image of the cosmetic product, the manufacturing date of the cosmetic product, the facility where the cosmetic product was manufactured, a list of ingredients for the cosmetic product, the locations and/or sources of the ingredients, a batch number for the cosmetic product, an expiration date for the cosmetic product, the condition of the cosmetic product, etc. Additionally or alternatively, the identification information may include a cryptographic hash of the characteristics of the cosmetic product. In some implementations, such as when the transaction is for minting an NFT, the transaction may include a smart contract address for interacting with a smart contract associated with cosmetic product NFTs, an indication that the transaction is for minting a new cosmetic product NFT, and/or an indication that the identification information is the metadata for the cosmetic product NFT.

At block 704, the transaction is augmented with a cryptographic signature from the manufacturer of the cosmetic product to prove the identity of the originator of the transaction. For example, the transaction may be signed by a private cryptographic key corresponding to the public cryptographic key owned by the manufacturer.

Then at block 706, the transaction is transmitted to one of the validating nodes 202, 250 in the distributed ledger network. For example, the manufacturer's client device 210 may broadcast the transaction to the distributed ledger. A validating node 202, 250 may then confirm the transaction is valid, add the transaction to a block of transactions, solve a cryptographic puzzle, and include the solution in the newly generated block as proof of the work done to generate the block. The validating node 202, 250 may then provide the newly generated block to each of the other validating nodes in the distributed ledger network to include the newly generated block in their respective copies of the distributed ledger.

Figure 8:
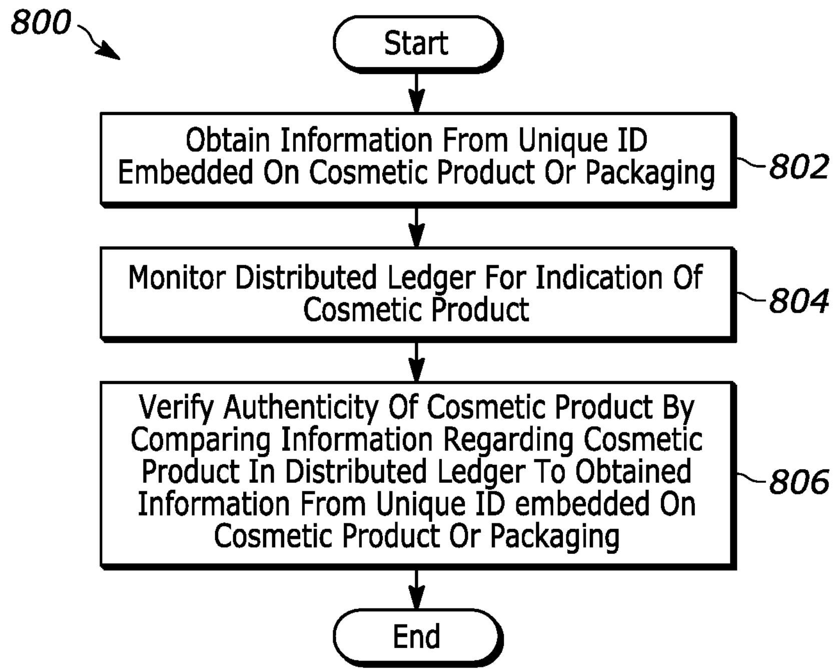
FIG. 8 illustrates a flow diagram of an example method for monitoring a distributed ledger to verify authenticity of a cosmetic product.

FIG. 8 illustrates a flow diagram of an example method 800 for monitoring a distributed ledger to verify authenticity of a cosmetic product. The method 800 may be executed by a client device 210 of a customer purchasing a cosmetic product.

At block 802, information is obtained from a unique identifier embedded on a cosmetic product or packaging. For example, the unique identifier may include characteristics of the cosmetic product, such as the name of the cosmetic product, the manufacturer of the cosmetic product, the serial number for the cosmetic product, an image of the cosmetic product, the manufacturing date of the cosmetic product, the facility where the cosmetic product was manufactured, a list of ingredients for the cosmetic product, the locations and/or sources of the ingredients, a batch number for the cosmetic product, an expiration date for the cosmetic product, etc.

At block 804, the distributed ledger is monitored for an indication of the cosmetic product. For example, the unique identifier may include identification information for a cosmetic product NFT corresponding to the cosmetic product, such as a token ID and smart contract address. The client device 210 may monitor the distributed ledger for the cosmetic product NFT to obtain the metadata for the cosmetic product ID from the distributed ledger and/or ownership information for the cosmetic product NFT.

Then at block 806, the client device 210 may verify the authenticity of the cosmetic product by comparing the information regarding the cosmetic product in the distributed ledger to the obtained information from the unique identifier embedded on the cosmetic product or packaging. For example, the client device 210 may compare the metadata for the NFT to the characteristics of the cosmetic product obtained from the unique identifier. The client device 210 may also determine whether the wallet address for the creator or minter of the NFT corresponds to a wallet address owned by the manufacturer.

In response to determining that the metadata for the NFT matches the characteristics of the cosmetic product 102 and that the minter is the manufacturer of the cosmetic product 102, the client device 210 may verify the authenticity of the cosmetic product.

Otherwise, the client device 210 may flag the cosmetic product as a potential counterfeit. The client device 210 may provide an alert to the user on the display of the client device 210 indicating that the cosmetic product 102 is a potential counterfeit and instructing the user not to use the cosmetic product 102. The client device 210 may also transmit a message to the manufacturer server device reporting the potential counterfeit and providing information about the potential counterfeit to the manufacturer server device so that the manufacturer is aware of these potential counterfeits in the marketplace.

This detailed description is to be construed as exemplary only and does not describe every possible embodiment, as describing every possible embodiment would be impractical, if not impossible. One may implement numerous alternate embodiments, using either current technology or technology developed after the filing date of this application.

Although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term “hardware module” should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a business or home environment, an office environment, or a server farm). In other example embodiments, the one or more processors or processor-implemented modules may be distributed across a number of geographic locations.

Unless specifically stated otherwise, discussions herein using words such as “processing,” “computing,” “calculating,” “determining,” “presenting,” “displaying,” or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112 (f) unless traditional means-plus-function language is expressly recited, such as "means for" or "step for" language being explicitly recited in the claim(s).

What is claimed:

1. A method for verifying authenticity of a cosmetic product using a distributed ledger maintained by a plurality of participants, the method comprising:

generating, by one or more processors, a transaction including identification information for a cosmetic product indicating a manufacturer of the cosmetic product and current product quality information for the cosmetic product indicative of a condition of the cosmetic product, wherein the cosmetic product includes one or more light sensors configured to detect an amount of light exposure for the cosmetic product which is used to detect a change in the condition of the cosmetic product, and wherein generating the transaction includes generating a recommendation to a user of the cosmetic product on how to prevent the condition of the cosmetic product from deteriorating;

augmenting, by the one or more processors, the transaction with a cryptographic signature from the manufacturer to prove the identity of the manufacturer; and transmitting, by the one or more processors, the transaction to at least one other participant in a distributed ledger network of participants maintaining the distributed ledger, wherein a unique identifier is embedded on the cosmetic product or on packaging for the cosmetic product that includes a link to a web page that (i) presents encrypted characteristics for the cosmetic product and (ii) references the identification information for the cosmetic product in the distributed ledger, wherein the characteristics are encrypted by the manufacturer using an encryption key, and wherein the characteristics include two or more of: a name of the cosmetic product, a serial number for the cosmetic product, a manufacturing date of the cosmetic product, a manufacturing facility where the cosmetic product was manufactured, one or more ingredients in the cosmetic product, one or more locations or sources of the one or more ingredients, a batch number for the cosmetic product, or an expiration date for the cosmetic product; and wherein a decryption key is provided by the manufacturer to decrypt the encrypted characteristics and compare to the identification information for the cosmetic product in the distributed ledger to verify authenticity of the cosmetic product.

2. The method of claim 1, wherein generating the transaction includes minting, by the one or more processors, a non-fungible token (NFT) representing the cosmetic product and wherein the web page includes a link to the NFT in the distributed ledger.

3. The method of claim 2, further comprising:

generating, by one or more processors, a smart contract for minting, exchanging, or modifying NFTs representing cosmetic products; and deploying, by the one or more processors, the smart contract to an address stored on the distributed ledger maintained by the plurality of participants in a distributed ledger network.

4. The method of claim 3, wherein the current product quality information is transmitted to the smart contract so that the NFT representing the cosmetic product is updated with the current product quality information.

5. The method of claim 1, wherein the unique identifier embedded on the cosmetic product or on the packaging for the cosmetic product includes at least one of:

a barcode, a radio frequency identification (RFID) tag, or a near-field communication (NFC) tag.

6. The method of claim 1, wherein the unique identifier embedded on the cosmetic product or on the packaging for the cosmetic product is a barcode printed on the cosmetic product using ink resistant to cosmetic ingredients.

7. The method of claim 1, wherein the unique identifier embedded on the cosmetic product or on the packaging for the cosmetic product is tamper resistant.

* * * * *